United States Patent [19]

Shimizu et al.

[11] Patent Number: 4,882,620
[45] Date of Patent: Nov. 21, 1989

[54] COLOR IMAGE READING APPARATUS WITH DISTRIBUTING TYPE LENS ARRAY AND SCAN RESPONSIVE SHUTTERS

[75] Inventors: Norimitu Shimizu; Chikaho Ikeda, both of Iwatsuki, Japan

[73] Assignee: Fuji Xerox Co., Ltd., Tokyo, Japan

[21] Appl. No.: 186,605

[22] Filed: Apr. 27, 1988

[30] Foreign Application Priority Data

Aug. 17, 1987 [JP] Japan .................................. 62-203786

[51] Int. Cl.$^4$ ......................... H04N 1/078; H04N 1/46
[52] U.S. Cl. ............................................ 358/75; 358/55
[58] Field of Search ...................... 358/55, 75, 294, 44

[56] References Cited

U.S. PATENT DOCUMENTS

| | | | |
|---|---|---|---|
| 4,590,514 | 5/1986 | Ikeda et al. | 358/75 |
| 4,654,536 | 3/1987 | Saito et al. | 250/578 |
| 4,663,535 | 5/1987 | Nakai et al. | 250/578 |
| 4,786,964 | 11/1988 | Plummer et al. | 358/44 |

FOREIGN PATENT DOCUMENTS 2152326 12/1984 United Kingdom .
2183120 10/1986 United Kingdom .

Primary Examiner—James J. Groody
Assistant Examiner—Robert M. Bauer
Attorney, Agent, or Firm—Spensley Horn Jubas & Lubitz

[57] ABSTRACT

A color image sensor comprises an image reading device, made up of a plurality of sensor elements each reading the image information of corresponding pixels, and an incident light splitter for splitting light to be incident on the sensor elements into a plurality of color components. The light rays incident on the sensors are splitted into a plurality of color components by the incident light splitting means. Each of the color components of the splitted incident light is sequentially read by one sensor.

4 Claims, 2 Drawing Sheets

COLOR IMAGE READING APPARATUS WITH DISTRIBUTING TYPE LENS ARRAY AND SCAN RESPONSIVE SHUTTERS

BACKGROUND OF THE INVENTION

This invention relates generally to a color image sensor, and more particularly to a color image sensor in use with a color image scanner, for example.

FIG. 1 shows a perspective view schematically illustrating a major part of a color image sensor 1 of the prior art.

The color image sensor 1 is a linear image sensor made up of solid-state image pick-up elements such as CCD. As shown, a plurality of optical sensors 2 are linearly arrayed at predetermined pitches P in the main scanning direction. Each optical sensor 2 reads the image information of one pixel, and is comprised of an optical sensor (R sensor) 3 for reading the red component of the color components contained in the image information, an optical sensor (G sensor) 4 for reading the green component, and an optical sensor (B sensor) 5 for reading the blue component.

On the other hand, a black and white image sensor 6 contains a plurality of optical sensors 7 each for picking up the image information contained in one pixel, as shown by a one-dot-chain line in FIG. 1. These sensors 7 are linearly arrayed at predetermined pitches P in the main scanning direction.

In the prior color image sensor 1 as mentioned above, to read the image information of one pixel, i.e., the color components of one picture element, three types of optical sensors, the R sensor 3, the G sensor 4, and B sensor 5 are required. Therefore, the structure of the color image sensor is more complicated than the black and white image sensor. This makes it difficult to manufacture the color image sensors, resulting in the increased cost to manufacture.

SUMMARY OF THE INVENTION

With the view of solving the above problems, this invention has an object to provide a color image sensor with a simple structure.

This invention has another object to provide a color image sensor which is easy and inexpensive to manufacture.

To achieve the above objects, there is provided a color image sensor comprising image read means made up of a plurality of sensors for reading the image information of pixels, and incident light splitting means for splitting light to be incident on each sensor into a plurality of color components so as to cause each sensor to read the plurality of the color components contained in one pixel.

Other objects and features of this invention will be understood when carefully reading the detailed description in connection with the accompanying drawings, in which:

DETAILED DESCRIPTION OF THE PREFERRED EMBODIMENT

Figure 2:
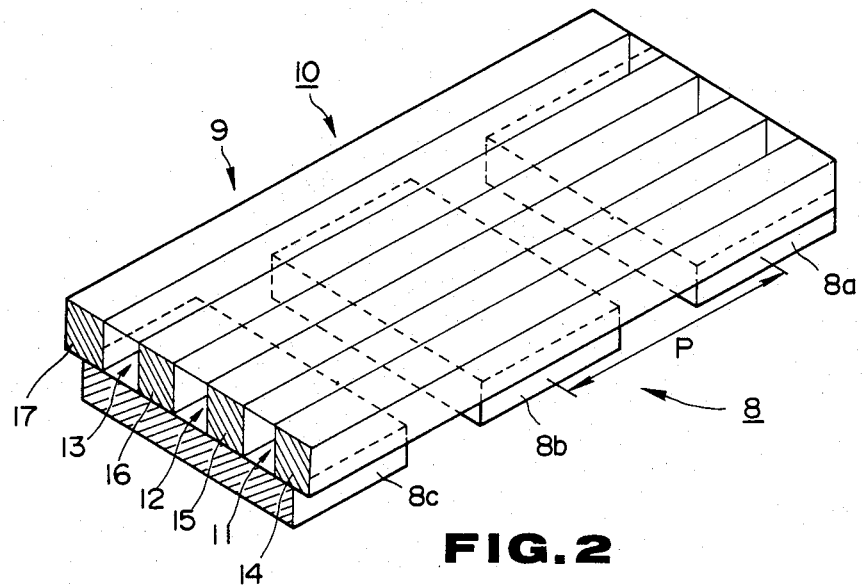
FIG. 2 shows a perspective view schematically illustrating an embodiment of a color image sensor according to this invention.

FIG. 2 shows a perspective view schematically illustrating an embodiment of a color image sensor according to this invention.

A color image sensor 10 comprises an optical sensor section 8, made up of solid-state image pick-up elements such as CCD, and an optical shutter array 9. The sensor section 8, as an image read means, includes a plurality of sensor elements 8a, 8b, 8c, . . . and picks up or reads image information and generates image data by an opto-electric conversion of the picked up image information. The electronic shutter 9, as an incident light splitting means, splits light incident on the optical sensor section 8 into light of predetermined color components.

The sensor elements 8a, 8b, 8c, ... , are arrayed in line at predetermined pitches P in the main scanning direction. As will be described, each of these sensor elements 8a, 8b, 8c, ... reads the color components (image information) of one pixel, respectively.

Figure 1:
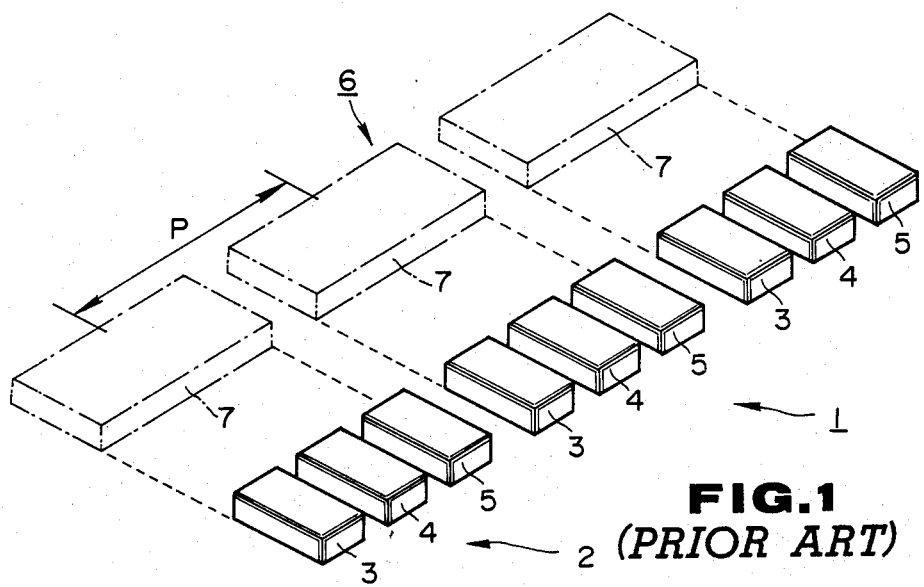
FIG. 1 shows a perspective view schematically illustrating a color image sensor of the prior art.

With such a structural arrangement of optical sensor 8, the number of sensor elements required for one pixel is equal to that of a black and white image sensor 6 as shown in FIG. 1. In other words, one sensor element is used for one pixel.

The optical shutter array 9, or the incident light splitting means, includes a first shutter 11, a second shutter 12, a third shutter 13, and electrodes 14, 15, 16 and 17 to which electric signals are applied to operate the shutters. The first shutter 11 is provided with an optical filter (not shown) allowing only red to pass therethrough. Only the red component of the color components constituting the image data passes through this shutter 11. The second shutter 12 is provided with an optical filter (not shown) allowing only green to pass therethrough. The green component alone passes through this shutter 12 to the optical sensor 8. The third shutter 13 is provided with an optical filter (not shown) allowing only blue to pass therethrough. The green component alone passes through this shutter 13 to the optical sensor 8. A control circuit (not shown in the drawings) supplies electric signals to the electrodes 14-17 such that when the shutter 11 opens, the shutters 12 and 13 are closed and when either of the shutters 12 and 13 opens the remaining two shutters are closed. The shutters 11 to 13 are made of PLZT, or solid solution $PbZrO_3$, $LaZrO_3$, $PbTiO_3$ or $LaTiO_3$ on which filtering material is coated.

The description to follow is the operation of the color image sensor 10 in connection with an image forming apparatus employing the color image sensor.

Figure 3:
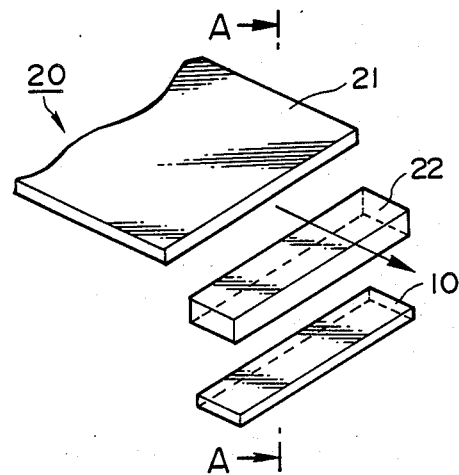
FIG. 3 shows a perspective view schematically illustrating an image forming apparatus incorporating the color image sensor according to this invention.

FIG. 3 schematically shows an image forming apparatus such as a digital copy machine, a facsimile, or a laser printer, which employs the color image sensor 10 according to this invention.

Figure 4:
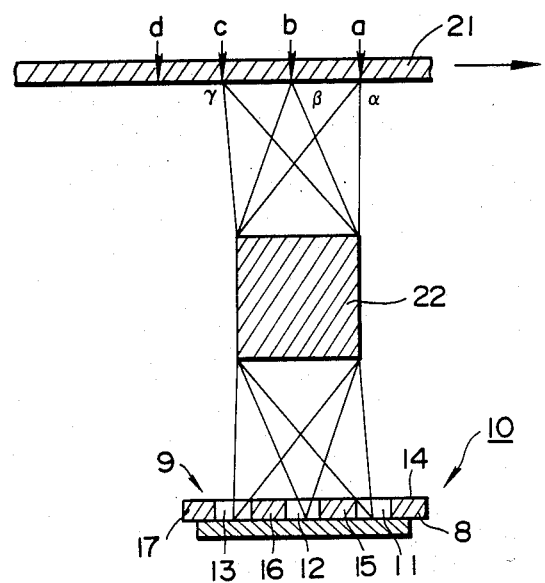
FIG. 4 shows a cross sectional view taken on line A - A in FIG. 3.

In the image forming apparatus 20, a selfoc lens 22 is provided between the color image sensor 10 and an original 21. The color information and the position information of the pixels of the original 21 are picked up by the color image sensor 10 through the lens 22. As shown in FIG. 4 which is an enlarged cross sectional view of FIG. 3, the image information (color component information) at points a, b and c of the original 21 is picked up through the shutters 11 to 13 which are sequentially opened when these points are located at read points α, β, and γ which are focal points of the lens 22. Referring to FIG. 4, the red component at point "a" on the original 2 is located at read point "α" and is read by the optical sensor section 8 through the shutter 11. The green component at point "b" on original 21 is located at read point "β" and is read by the optical sensor 8 through the shutter 12. The blue component at point "c" on original 21 is located at read point γ and is read by the optical sensor 8 through the shutter 13. In this embodiment, the shutters 11, 12 and 13 are controlled by the control circuit (not shown) so as to open in this order sequentially.

The operation of the image forming apparatus 20 will be described in more detail.

It is assumed that points "a", "b", and "c" of the original 21 are located at read points "α", "β", and "γ" of the lens 22, as shown in FIG. 4. The shutters 11 to 13 of the optical shutter array are sequentially opened and closed. As a result, the red component at point "a", the green component at point "b" and the blue component at point "c" are sequentially read by the optical sensor 8. Then, the original 21 moves in the sub-scanning direction (arrow direction). When the points "b", "c" and "d" reach the corresponding read points "α", "β" and "γ" of the lens 22, the red component at point "b", the green component at point "c", and the blue component at point "d", and the position components at the respective points are read by the optical sensor section 8. The sequence of the above operations is repeated, so that the color components (image information) at the respective points (pixels) are read by the optical sensor section 8. In this way, the optical sensor section 8 of the color image sensor 10 sequentially reads the image information, for example, at point "c" in FIG. 4, viz., the blue, green and red color components in this order, with the movement of the original 21 in the sub-scanning direction. The color components at the respective points of the original 21 as read by the optical sensor 8, and the position data as well are transmitted to the image memory section (not shown) of the image forming apparatus 20, and stored therein.

To reproduce the image data of the original 21, it is only needed to read out the image (color) data and the position data of the pixels from the image memory section.

In the above-mentioned embodiment, the shutters 11, 12, and 13 are sequentially opened and closed in that order. If necessary, these shutters may be sequentially opened and closed in the reverse order, i.e., 13, 12 and 11 or any other orders.

As described above, in the color image sensor according to this invention, the optical shutter array including a plurality of shutters which are independently operable, is disposed on the sensor section 8 in the sub-scanning direction. A plurality of the color components of each pixel are read by a single sensor element. Therefore, the number of the sensor elements required is reduced, and their construction is simple. As a result, the color image sensor can be manufactured in a simple manner, and the cost of the manufactured image sensor is inexpensive.

It should be understood that this invention may be variously changed and modified within the scope of the invention, and that the embodiment as mentioned above is specific and used by way of example. Further, it is evident that this invention should be interpreted from the scope of the appended claims alone, and not limited by the description in the main body of the specification in any way.

What is claimed is:

1. A color image reading apparatus for scanning an original comprising:
    an image sensor having a plurality of sensor elements each being independently disposed and corresponding to each pixel in a main scanning direction of the original;
    a refractive index distributing type lens array for simultaneously imaging three pixels neighboring one another along a sub-scanning direction of said original on three different positions of each of said sensors;
    a red filter, a blue filter, and a green filter each being disposed on each of said three different positions of each of said sensors; and
    first, second, and third shutters each being disposed between each of said filters and each of said sensors, said shutters being made to be independently and sequentially opened and closed in a predetermined timing in response to the movement of said original in said sub-scanning direction.

2. The color image reading apparatus according to claim 1, wherein said image sensor is a linear image sensor made up of solid-state image pick-up elements.

3. The color image reading apparatus according to claim 1, wherein said refractive index distributing type lens array is a selfok lens array.

4. The color image reading apparatus according to claim 1, wherein said first, second, and third shutters comprise an optical shutter array made of PLZT or solid solution mainly composed of $PbZrO_3$, $LaZrO_3$, $PbTiO_3$ or $LaTiO_3$.

* * * * *